Jan. 3, 1933.    R. R. ROBERTSON    1,892,684
CAMERA
Filed Oct. 20, 1930
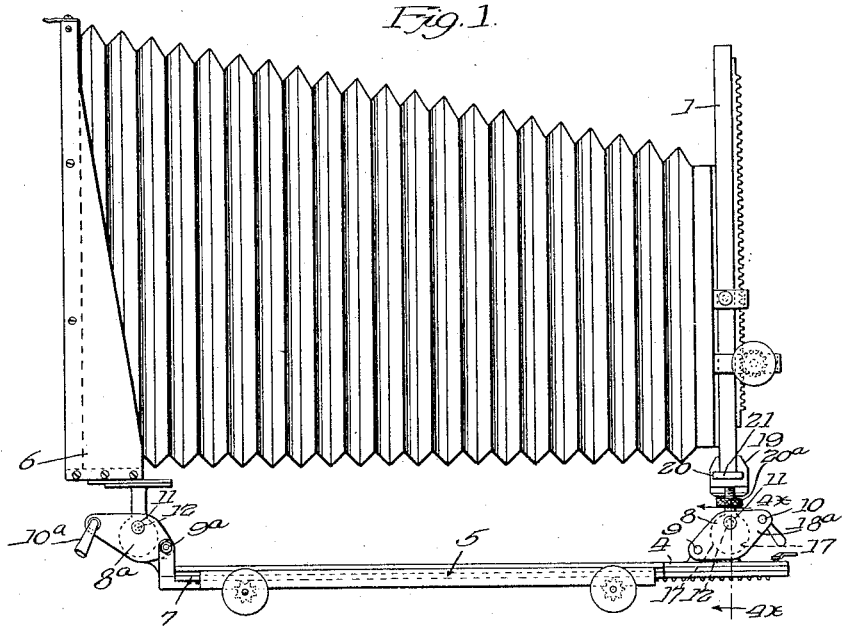
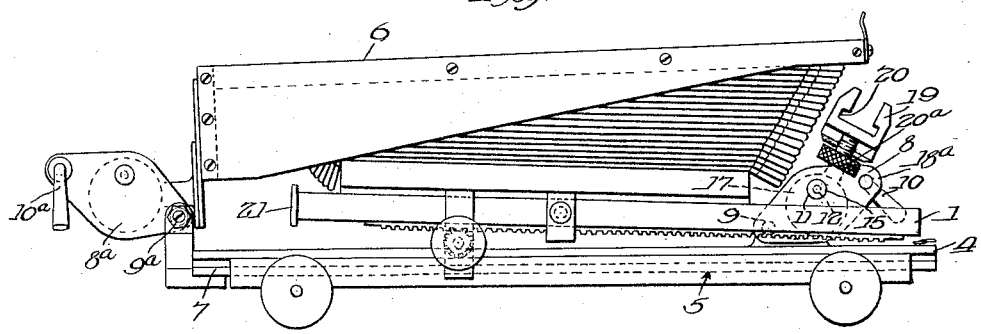
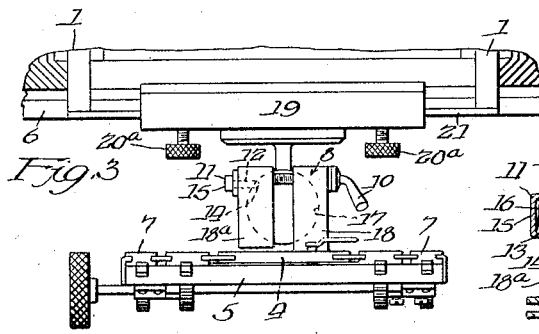
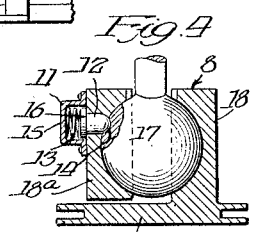
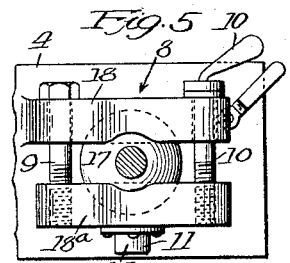
Witness:
R. B. Davison.
Inventor:
Robert Roy Robertson
By Wilkinson, Huxley, Byron & Knight
Attys.

Patented Jan. 3, 1933

1,892,684

UNITED STATES PATENT OFFICE

ROBERT R. ROBERTSON, OF EVANSTON, ILLINOIS

CAMERA

Application filed October 20, 1930. Serial No. 489,762.

This invention relates to photographic cameras adapted for various uses, such, for instance, as portrait cameras, view cameras and cameras for copying subject-matter as a step in the art of producing printing plates.

The object of the invention is to improve the construction of various parts of the camera with a view to rendering more convenient such adjustments as may be involved in its manipulation and afford adjustments not heretofore provided for in cameras.

In the manipulation of cameras, means has heretofore been provided for imparting various angular adjustments to both the lens frame and the exposure frame with a view to bringing the confines of the areas of these frames normal to the lines of the subject being photographed, and such adjustments have included means for tipping the frame in the plane of the frame about either of its corners. But such adjustment is in many instances undesirable because requiring bodily vertical or lateral adjustments in order to prevent throwing the image out of center; moreover, it has required a special mechanism on each side of the frame for the purpose of effecting adjustment in opposite directions, and other additional mechanisms for imparting adjustments for inclining the frame forward or backward, or swinging either side forward or backward upon the other side as a pivot.

The present invention eliminates these disadvantages by providing a single adjustable support for a camera frame, whether it be the front frame that carries the lens tube (herein referred to as the lens frame) or the rear frame which carries the focusing glass and sensitized surface (herein referred to as the focusing frame), which single adjustable support will give to the frame all of the adjustments referred to, besides lending to its adjustments a new character in that the center of oscillation of each adjustment will be at an intermediate point on the frame, which involves very much less disturbance of the general position of the frame and reduces the necessity for bodily displacement of the frame in keeping it within the desired range. To these ends, one feature of the present invention consists in having a frame of a photographic camera mounted upon the bed upon which it may have the conventional focusing and other adjustments through the medium of a universal joint, for instance, a ball and socket joint, which is connected with the frame at a point intermediate of the sides of the frame and giving the frame freedom of oscillatory adjustments including fore-and-aft swinging movement, sidewise tipping movement in the plane of the frame, and rotation about a vertical axis, all through the medium of this single bearing. Subordinate features of this part of the invention consist in means for conveniently normalizing the position of the ball and socket support to hold the frame initially but releasably in a position in which its sides are vertical and its plane is perpendicular to the focal axis, such means consisting of a snap latch carried by one of the ball and socket members and entering a recess in the other of said members when the frame reaches its said normal position; also means whereby the single support of the frame may serve as a hinge for permitting the frame to be folded into a position which will greatly reduce the overall dimensions of the camera when it is not in use; this last-named feature being applied, for instance, to the focal frame so that the lens frame, when telescoped with the focal frame by collapsing the bellows, will partake of the swinging folding movement. To thus telescope the lens frame with the focal frame, the lens frame is made readily releasable from its single, intermediately placed, universal joint support.

Figure 1 is a side elevation of a camera mounted to have the new adjustments forming the subject matter of the present invention;

Figure 2 is a view similar to Figure 1, but showing the camera in its collapsed position;

Figure 3 is a fragmentary view showing the front elevation of the camera shown in Figure 1;

Figure 4 is a sectional detail view of the ball and socket members of the single adjusting support used for the lens frame, and which is substantially the construction of a similar support used for the focal frame of the camera, the section being taken on the line 4x—4x of Figure 1; and Figure 5 is a top plan view of the ball and socket connection of the single frame support shown in Figure 4.

Referring to Figure 1, 1 represents the frame that carries the lens tube and herein referred to as the lens frame; 4 is the longitudinally movable carriage upon which the lens frame is mounted; 5 is the bed; 6 is the focus frame; 7 is the focusing carriage upon which the focus frame is mounted; 8 and 8a are the single, intermediately positioned, adjusting supports upon which the two members are, respectively, mounted; 9 and 9a are stationary gripping screws of the clamping sockets of the universally adjustable supports; 10 and 10a are the releasing screws of said socket members; 11 represents the normalizing latch for the universal joint support. Normalizing latch 11 comprises a pin 12 thrust by spring 13 into a recess 14 whenever ball 17 assumes a position relatively to its clamping jaws 18, 18a which brings the camera frame mounted on the ball in a predetermined exact position upon the bed, for instance; a position in which the sides of the camera frame are vertical and the focal axis horizontal, parallel with the longitudinal axis of the bed. Spring 13 is housed in cap 15 and latch pin 12 has a head 16 that limits its intrusion into the jaw that carries it and also provides the seat for the spring. While normalizing latch 11 is shown mounted on the movable jaw 18a of the universal joint support instead of the fixed jaw 18, obviously this is immaterial.

As shown best in Figures 2, 4 and 5, 17 represents the ball, 18 the fixed socketed jaw and 18a the movable socketed jaw of the universally adjustable frame support, which is of substantially identical construction in each of the situations 8 and 8a in Figure 1 so that a description of structural details of one of these adjustable supports may be taken for both. 9 represents the set or stationary clamping screw and 10 the tightening and releasing screw of the two-part ball socket 18, 18a.

19 represents a horizontal coupling between the lens frame and its single adjustable support 8, such coupling comprising an undercut channeled shoe 20 fixed to the adjustable support and a T-rail 21 (see Fig. 1) fitted in said channel by longitudinal movement of the lens frame and there secured by means of set screws 20a, so that when it becomes desirable to fold the camera for transport, screws 20a are loosened, the T-rail 21 of lens frame 1 is slid laterally out of the shoe 20 and moved back into telescoping relation to the focus frame 6, and the latter by loosening the clamping screw 10a may then swing forwardly and downwardly upon its universal joint 8a until the now collapsed frames and bellows lie upon the bed 5 as shown in Figure 2. Previous to folding the camera in this way, the lens tube in accordance with conventional practice, will have been removed from the lens frame, being omitted from the drawing.

From the foregoing, it is seen that by the simple use of two ball and socket mountings a camera is provided in which the lens frame and focus frame may be angularly adjusted with a minimum of lateral displacement, and in which the focus frame may be tilted through an angle of ninety degrees so that the bellows being collapsed, it may lie parallel to the bed of the camera, thus taking up a minimum of space.

What is claimed is:

1. In a photographic camera, a bed, a frame-member adjustable in the manipulation of the camera, and ball and socket means mounting said frame-member upon said bed located intermediate the sides of the frame-member, said ball and socket means permitting a rocking movement in a plane transverse to the focal axis of the camera also an angular movement in a plane perpendicular to the bed and parallel with the focal axis through an angle of substantially ninety degrees, whereby the frame member may be folded down upon the bed.

2. In a photographic camera, a bed, a frame-member adjustable in the manipulation of the camera, and means mounting said frame-member upon said bed located intermediate the sides of the frame member and having rocking movement in a plane transverse to the focal axis of the camera and in a plane coincident with said axis, the means for mounting the frame-member upon the bed including a ball member and socket member, and a normalizing pin carried by one of said members and entering a recess in the other of said members when the camera frame-member reaches normal position.

3. In a photographic camera, a bed, a frame-member adjustable in the manipulation of the camera, and means mounting said frame-member upon said bed located intermediate the sides of the frame member and having rocking movement in a plane transverse to the focal axis of the camera and in a plane coincident with said axis, the means for mounting the frame-member upon the bed including a ball member and socket member; and a normalizing snap latch arresting relative movement between the ball member and socket member when the frame-member reaches normal position.

4. In a photographic camera, a bed, a frame-member adjustable in the manipulation of the camera, and means mounting said frame-member upon said bed located intermediate the sides of the frame member and having rocking movement in a plane transverse to the focal axis of the camera and in a plane coincident with said axis, the means for mounting the frame-member upon the bed including a ball member and socket member, the socket being formed of two opposed hollowed jaws and means for clamping said jaws upon the ball; the jaws being in planes parallel to the focal axis, and the ball being rotatable substantially ninety degrees between the jaws in the plane of said axis.

5. In a photographic camera, a bed, a lens frame, a focal frame adjustable in the manipulation of the camera, and a separate and independent means for mounting each frame upon the bed, each connected with its respective frame independent of the sides of the frame, and each permitting, to the frame which it connects, lateral rocking movement independently of the other frame in a plane transverse to the focal axis of the camera.

6. In a photographic camera, a bed, a lens frame, a focal frame, means providing a light channel between said frames while permitting them to rock from side to side, and fore-and-aft on the bed, each independently of the other, and a universal joint connecting each frame with the bed and affording to each frame fore-and-aft rocking movement through an angle of substantially ninety degrees whereby they may fold down upon the bed.

7. A camera according to claim 6, in which one frame with its universal joint is bodily adjustable fore-and-aft of the bed to bring it within the swinging radius of the other frame, and one frame telescopes into the other frame to render more compact their folded relation to the frame.

Signed at Chicago, Illinois, this 17th day of October, 1930.

ROBERT R. ROBERTSON.